(12) United States Patent
Wegener

(10) Patent No.: US 7,844,097 B2
(45) Date of Patent: Nov. 30, 2010

(54) COMPRESSION AND DECOMPRESSION OF COMPUTED TOMOGRAPHY DATA

(75) Inventor: Albert W. Wegener, Portola Valley, CA (US)

(73) Assignee: Samplify Systems, Inc., Santa Clara, CA (US)

( * ) Notice: Subject to any disclaimer, the term of this patent is extended or adjusted under 35 U.S.C. 154(b) by 623 days.

(21) Appl. No.: 11/949,670

(22) Filed: Dec. 3, 2007

(65) Prior Publication Data
US 2009/0169119 A1   Jul. 2, 2009

(51) Int. Cl.
*G06K 9/00* (2006.01)
(52) U.S. Cl. .................................... 382/131; 382/239
(58) Field of Classification Search ................ 382/128, 382/131, 232, 239; 378/4
See application file for complete search history.

(56) References Cited

U.S. PATENT DOCUMENTS

| | | | |
|---|---|---|---|
| 4,982,415 A | 1/1991 | Shibata et al. | 378/15 |
| 5,055,821 A | 10/1991 | Keller et al. | 340/286.01 |
| 5,204,943 A | 4/1993 | Watanabe et al. | 395/118 |
| 5,357,549 A | 10/1994 | Maack et al. | 378/62 |
| 5,615,287 A | 3/1997 | Fu et al. | 382/232 |
| 5,703,965 A | 12/1997 | Fu et al. | 382/232 |
| 6,144,772 A | 11/2000 | Garland et al. | 382/239 |
| 6,259,761 B1 | 7/2001 | Lai | 378/15 |
| 6,292,919 B1 | 9/2001 | Fries et al. | 714/758 |
| 6,327,327 B1 | 12/2001 | Herold et al. | 378/15 |
| 6,327,330 B1 | 12/2001 | Peter | 378/19 |
| 6,343,109 B2 | 1/2002 | Doubrava et al. | 378/4 |
| 6,433,631 B2 | 8/2002 | Pearson, Jr. et al. | 329/311 |
| 6,470,065 B1 | 10/2002 | Lauther | 378/4 |
| 6,560,307 B2 | 5/2003 | Marume | 378/4 |
| 6,671,755 B1 | 12/2003 | Leahy et al. | 710/69 |
| 6,914,957 B2 | 7/2005 | Dafni et al. | 378/15 |
| 7,240,251 B2 | 7/2007 | Popescu | 714/704 |

(Continued)

FOREIGN PATENT DOCUMENTS

JP    58019238 A    2/1983

(Continued)

OTHER PUBLICATIONS

Manduca, Armando et al., "Histogram transformation for improved compression of CT images," SPIE vol. 3031 (1997) 320-327.

(Continued)

*Primary Examiner*—Andrew W Johns
(74) *Attorney, Agent, or Firm*—Carolyn Koenig; Haynes Beffel & Wolfeld LLP

(57) ABSTRACT

A compression method and subsystem for a CT scanner compresses projection data from the data acquisition system. The projection data are classified into subsets of more significant samples and subsets of less significant samples. The subsets are compressed in accordance with compression control parameters so that the less significant samples are compressed to a greater degree than the more significant samples. The bit rate of the compressed projection data can be monitored and the compression control parameters can be adjusted to provide a desired bit rate. The compressed data are decompressed in accordance with the compression control parameters for reconstruction of an image from the decompressed projection data. This abstract does not limit the scope of the invention as described in the claims.

25 Claims, 10 Drawing Sheets

U.S. PATENT DOCUMENTS

| | | | |
|---|---|---|---|
| 7,248,641 B2 | 7/2007 | Schilling et al. | 375/295 |
| 7,254,210 B2 | 8/2007 | Popescu | 378/19 |
| 7,274,765 B2 | 9/2007 | Krumme et al. | 378/15 |
| 7,327,866 B2 | 2/2008 | Bae et al. | 382/131 |
| 7,502,438 B2 | 3/2009 | Nakagawa et al. | 378/15 |
| 2002/0031277 A1 | 3/2002 | Lubin et al. | 382/254 |
| 2003/0199757 A1 | 10/2003 | Toth et al. | 600/425 |
| 2003/0228041 A1 | 12/2003 | Bae et al. | 382/131 |
| 2004/0022447 A1 | 2/2004 | Mukhopadhyay et al. | 382/243 |
| 2004/0062341 A1 | 4/2004 | Popescu et al. | 378/4 |
| 2004/0120564 A1 | 6/2004 | Gines | 382/131 |
| 2004/0122968 A1 | 6/2004 | Schilling et al. | 709/232 |
| 2005/0002547 A1 | 1/2005 | Torre-Bueno | 382/128 |
| 2005/0033882 A1 | 2/2005 | Peyerl et al. | 710/52 |
| 2006/0291731 A1 | 12/2006 | Schoisswohl | 382/238 |
| 2007/0009080 A1 | 1/2007 | Mistretta | 378/4 |
| 2007/0065032 A1* | 3/2007 | Hernandez et al. | 382/239 |
| 2007/0065033 A1 | 3/2007 | Hernandez et al. | 382/239 |
| 2007/0242798 A1 | 10/2007 | Popescu | 378/21 |
| 2008/0075213 A1 | 3/2008 | Popescu | 375/354 |
| 2008/0205446 A1 | 8/2008 | Popescu et al. | 370/473 |
| 2008/0219567 A1* | 9/2008 | Claus et al. | 382/232 |
| 2008/0292168 A1 | 11/2008 | Winkelmann | 382/131 |
| 2009/0046913 A1 | 2/2009 | Chandra | 382/131 |
| 2009/0147908 A1 | 6/2009 | Garms | 378/4 |

FOREIGN PATENT DOCUMENTS

| | | |
|---|---|---|
| JP | 01093864 A | 4/1989 |
| JP | H4-261650 A | 9/1992 |
| JP | 06030924 A | 2/1994 |
| JP | 07000386 A | 1/1995 |
| JP | 08084725 A | 4/1996 |
| JP | 10127616 A | 5/1998 |
| JP | 2003290216 A | 10/2003 |
| WO | 2007038187 A2 | 4/2007 |
| WO | WO-2008155200 A1 | 12/2008 |

OTHER PUBLICATIONS

Thammineni, Arunoday, et al., "Segmentation-based CT Image Compression," SPIE Vo. 5371 (2004) 160-169.

Wegener, U.S. Appl. No. 12/208,839 entitled "Adaptive Compression of Computed Tomography Projection Data," filed Sep. 11, 2008, 36 pages.

Wegener, U.S. Appl. No. 12/352,116, filed Jan. 12, 2009 entitled "Compression and Storage of Projection Data in a Computed Tomography System," 73 pages.

Wegener, U.S. Appl. No. 12/208,835, filed Sep. 11, 2008 entitled "Edge Detection for Cmputed Tomography Projection Data Compression," 32 pages.

Wegener, U.S. Appl. No. 12/352,322, filed Jan. 12, 2009 entitled "Compression and Storage of Projection Data in a Rotatable Part of a Computed Tomography System," 71 pages.

Search Report and Written Opinion from PCT/US2008/085417 mailed Jun. 2, 2008, 11 pages.

Bae, Kyongtae T., et al., "CT Data Storage Reduction by Means of Compressing Projection Data Instead of Images: Feasibility Study," Radiology, vol. 219, No. 3, Jun. 2001, 850-855.

Young, Susan S., et al., "Statistically lossless image compression for CR and DR," SPIE Vo. 3658, Feb. 1999, 406-419.

Search Report Mailed Mar. 30, 2010 in PCT/US2009/056469 10 pages.

Search Report Mailed Apr. 14, 2010 in PCT/US2009/056475 10 pages.

Hashimoti, Masayuki, et al., "CT Image Compression with Level of Interest," 2004 IEEE Int'l Conf. on Image Processing (ICIP), 4 pages.

* cited by examiner

COMPRESSION AND DECOMPRESSION OF COMPUTED TOMOGRAPHY DATA

BACKGROUND OF THE INVENTION

The present invention relates to compression and decompression of projection data acquired for computed tomography (CT), particularly to applying different compression methods to different portions of the CT projection data.

In a CT imaging systems, multiple x-ray radiographic views of an object produce sets of projection data. Each line of projection data represents an integration of density values of internal structures within a plane, or slice, of the object. From the multiple sets of projection data, the CT imaging system produces two-dimensional (2D) cross-sectional images and three-dimensional (3D) images of the internal structures of the object. The images are obtained through application of well known image reconstruction algorithms to the sets of projection data. The techniques that reconstruct cross-sectional images or three-dimensional images from multiple sets of projection data are broadly referred to as "tomography". Performing the image reconstruction using a programmable processor-based device is broadly referred to as computed (computerized or computer-assisted) tomography. In a typical application, a source of x-ray radiation projects x-rays through an object onto an x-ray sensor (or detector) array. The x-ray sensor outputs are digitized to form a set of projection data. The set of projection data can be one-dimensional or two-dimensional depending on the geometry of the detector array. Relative movement between one or more of the object, the x-ray source and the x-ray sensor array provides multiple views having different perspectives. An image of a slice through the object, or a cross-sectional image, can be approximated by the use of mathematical transforms of the multiple views. In certain applications, the cross-sectional images may be combined to form a 3D image of the object that may be otherwise unobservable.

A well-known application of x-ray CT is in medical CT scanners for non-invasive imaging of a human body. In medical CT scanners, multiple views are obtained by rotating the x-ray source and detector array using a gantry and transferring the projection data across the slip ring. Modern CT scanners (as of 2007) digitize tens of thousands of x-ray sensor outputs in the range of one to seven kilosamples per second (ksamp/sec) with each digital sample having 16 to 24 bits per sample, resulting in an aggregate data transfer bandwidth of many gigabits per second (Gbps) across the slip ring. As the industry strives for increased spatial and temporal resolution and increased numbers of x-ray sensors, the bandwidth demand for data transfer and data storage subsystems will soon surpass 10 Gbps.

Another application of x-ray CT is in automated inspection of industrial products. For example, cross-sectional images reconstructed from x-ray projection data is used in quality control inspection systems for manufactured products including as electronic devices, such as printed circuit boards. Tomography can be used to reconstruct images of one or more planes, or cross-sections, of an object under study in order to evaluate the quality of the object. The x-ray CT system acquires sets of projection data at various location and views with respect to the object of interest. The system architectures for industrial inspection systems differ from medical CT scanners. However, like medical CT systems, large volumes of projection data require data transfer and storage. For automated inspection systems, higher throughput of the objects under test is desirable because it reduces the cost of the product being tested. A higher throughput increases the bandwidth demands for data transfer and data storage.

The large volumes of projection data acquired by a data acquisition subsystem of a CT system create a burden on system resources for data transfer and data storage. Limitations in data transfer bandwidth delays the availability of projection data for the reconstruction and display of an image of the object being scanned. Compressing the projection data prior to data transfer followed by decompression before image reconstruction processing reduces the burden on system resources for data transfer and storage. The benefits of compression include reducing latency between data acquisition and image display, increasing the volume of data transferred over a communication channel having limited bandwidth and providing compressed projection data for storage and transmission over a network for later access and image reconstruction. Since compression allows the system resources to accommodate more projection data, the image resolution can be improved and/or a larger region of the object can be scanned. The availability of computing resources to implement compression operations is also a constraint in CT systems. It is desirable that the compression operations have low computational complexity and that can operate in real time to minimize the impact on computing resources.

In computed tomography, there are two domains of image-related data, the Radon transform domain and the spatial domain. The projection data, or sinogram data, are in the Radon transform domain, also referred to as the projection domain or sinogram domain. The projection data can be 2D in the situation where projection data are obtained for one slice of the object or resulting from a linear array of x-ray sensors. The projection data can be 3D in the situation where projection data are obtained for more than one slice of the object or resulting from a two-dimensional array of x-ray sensors. The 2D cross-sectional images reconstructed from the projection data are in the 2D spatial domain. A three-dimensional image constructed from the multiple cross-sectional images is in the 3D spatial domain. The Radon transform is the mathematical transform that underlies the relationship between the projection data in the Radon transform domain and the spatial domain image reconstructed from the projection data. Applying a compression algorithm to the projection data in the Radon transform domain will not produce the same results as applying the same algorithm to the reconstructed image in the spatial domain because of the mathematical relationship between the projection data and the reconstructed image.

Image compression techniques, for example JPEG image compression, are typically applied to spatial domain image data, for example photographic images. Spatial domain image compression techniques are also applied to reconstructed images in computed tomography for efficient image storage or transmission of the spatial domain image. An approach to achieve additional compression in the spatial domain image is to identify regions of interest in the image and apply lossless compression to the regions of interest and lossy compression to areas outside the region of interest. Examples of this approach are described in the article entitled, "Segmentation-based CT Image Compression" by Thammineni et al. in the Proceedings of SPIE, Vol. 5371, pp. 160-169, 2004 and in the conference paper entitled, "CT Image compression with Level of Interest," by Hashimoto et al., IEEE 2004 International Conference on Image Processing, pp. 3185-88.

For the projection, or sinogram, domain, compression and decompression of projection data are applied prior to reconstruction of an image in the spatial domain. Some approaches to compression of projection data apply a JPEG image compression method in the projection domain. An example of this approach is described by Bae et al. in the US Patent Application Publication No. 2003/0228041 entitled, "Method and Apparatus for Compressing Computed Tomography Raw Projection Data," published Dec. 11, 2003. This approach applies lossless or lossy compression to the projection data. An approach to compress the projection data that falls within the boundaries of object being scanned is described by Nishide et al. in the Japanese published patent application entitled, "X-Ray CT Apparatus, System and Projection Data Compressing/Restoring Method", Kokai (unexamined) Patent Publication Number 2003-290216 (P2003-290216A), published on Oct. 14, 2003. This approach separates the projection data into air information regions, where the x-rays have traversed an empty region, and subject information regions, where the x-rays have traversed the object or patient. Different compression methods are applied to the air information region and the subject information region or the air information region may be deleted.

Disadvantages of the above approaches to compression of the projection data include the following. The bit rate of the compressed data can vary unpredictably in the above techniques because the regions of interest defined and lossless compression are data dependent. Since the bandwidth of the compressed data varies over time, an interface such as a FIFO will be required to support the varying data rates. A FIFO interface is more complicated than a fixed-rate interface, since it requires additional control signals (half full, almost full, almost empty, etc.). It would be advantageous to control the bit rate of the compressed data within a desired range. A lossy fixed-rate compression mode would allow control of the bandwidth of compressed data. The compressed data can then be transferred across an interface to a storage medium at a fixed data rate. The fixed data rate simplifies the interface for transfer of the compressed data. Another disadvantage is computational complexity, depending on which compression method is applied. It would be advantageous to reduce the computational complexity to decrease the burden on system resources and allow real time compression of the projection data.

In this discussion, "real time" means a rate that is at least as fast as the sample rate of a digital signal. The term "real time" can be used to describe rates for processing, transfer and storage of the digital signal. The sample rate is the rate at which an analog to digital converter (ADC) forms samples of a digital signal during conversion of an analog signal. When converting a digital signal to an analog signal, the sample rate is the rate at which the digital to analog converter (DAC) forms the analog signal from the samples of the digital signal. The bit rate of an uncompressed sampled, or digital, signal is the number of bits per sample multiplied by the sample rate. The compression ratio is the ratio of the bit rate of the original signal samples to the bit rate of the compressed samples. For this application, real time refers to the rate at which the ADC forms the digital samples of projection data from the output signal of the x-ray sensor.

This description refers to lossless and lossy compression. In lossless compression, the decompressed samples have identical values to the original samples. If lossless compression does not give adequate reductions in the bit rate of the compressed samples, then lossy compression may be necessary to provide sufficient reduction of the bit rate. In lossy compression, the decompressed samples are similar, but not identical to, the original samples. Lossy compression creates a tradeoff between the bit rate of the compressed samples and the distortion in the decompressed samples.

SUMMARY OF THE INVENTION

Embodiments of the present invention have been made in consideration of the foregoing conventional problems. An object of the present invention is to compress CT projection data to better utilize the resources of a CT imaging system.

To realize the foregoing object, one aspect of the present invention provides a method for compressing projection data in a computed tomography system, the computed tomography system providing a plurality of sensor measurements to form one or more sets of projection data, wherein each set of projection data represents a portion of a projection domain and includes an array of samples, the array having at least one line, the samples including more-significant samples and less-significant samples. The method comprises:

setting one or more compression control parameters to control compression operations, the compression control parameters including at least one compression control parameter corresponding to the more-significant samples and at least one compression control parameter corresponding to the less-significant samples;

classifying the samples of at least one line in the set of projection data into at least two subsets in accordance with a classification control parameter, the subsets including at least one more-significant subset containing the more-significant samples and at least one less-significant subset containing the less-significant samples;

compressing the samples of each subset by applying the compression operations in accordance with the corresponding compression control parameter to form a corresponding subset of compressed data, wherein a compression ratio for the less-significant subset is greater than a compression ratio for the more-significant subset; and adjusting one or more of the compression control parameters in accordance with a feedback parameter based on a characteristic of the compressed data.

Another aspect of the present invention that realizes the foregoing object provides a data compression apparatus for projection data measured by a computed tomography system, the computed tomography system providing a plurality of sensor measurements to form one or more sets of projection data, wherein each set of projection data represents a portion of a projection domain and includes an array of samples, the array having at least one line, the samples including more-significant samples and less-significant samples. The data compression apparatus comprises:

a classifier coupled to receive the projection data and classifying the samples in at least one line of the projection data into at least two subsets to produce at least one more-significant subset and at least one less-significant subset in accordance with a classification control parameter;

a compressor that receives the more-significant subset and the less-significant subset and applies respective compression operations to the samples of each subset in accordance with a corresponding compression control parameter to form corresponding subsets of compressed data, wherein a compression ratio for the less-significant subset is greater than the compression ratio for the more-significant subset; and a controller coupled to the classifier and the compressor, the controller determining a feedback parameter and adjusting at least one compression control parameter in accordance with the feedback parameter.

Another object of the present invention is to decompress the compressed CT projection data for image reconstruction processing. An aspect of the present invention that realizes this object provides an apparatus for decompression of compressed projection data, the compressed projection data corresponding to original projection data resulting from sensor measurements in a computed tomography system. The apparatus comprises:

a storage device storing the compressed projection data, wherein the compressed projection data include a plurality of more-significant subsets and a plurality of less-significant subsets of compressed data;

a decompressor applying respective decompression operations to the more-significant subsets and less-significant subsets of compressed data in accordance with corresponding compression control parameters to form more-significant subsets of decompressed data and less-significant subsets of decompressed data, the decompressor providing the decompressed data to an image reconstruction processor;

a controller extracting the corresponding compression control parameters from the compressed data and providing the corresponding control parameters to the decompressor.

DETAILED DESCRIPTION

Embodiments of the present invention are directed to compression and decompression of projection data in the Radon transform domain, or projection domain. Compression of projection data allows more efficient data transfer from the data acquisition subsystem of a CT system to a storage subsystem and an image reconstruction processor. Later decompression of the compressed projection data is applied prior to image reconstruction of a spatial domain image. Alternative embodiments of compression and decompression can be applied to one set of projection data resulting from one view or to multiple sets of projection data resulting from multiple views. The present invention is independent of the number of views used by the image reconstruction processor to compute a spatial domain image.

Embodiments of the present invention can be used for compressing and decompressing projection data in a medical computerized tomography scanner for generating cross-sectional images of a human body and in industrial computed tomography systems for inspecting an object under study. In medical computerized tomography scanners, an x-ray source and detector array are rotated about the patient by a rotating gantry. The projection data acquired by the detector array are transmitted via a communication channel between the rotating unit and stationary unit of the gantry system to a storage system and later to a processor for image reconstruction. In an industrial computed tomography system, the x-ray source and detector array may have limited motion or remain stationary and the object under study may be translated or rotated. The projection data are transmitted by a communication link to a storage device and later to a processor for image reconstruction. In both applications, the communication channel has limited bandwidth. The bandwidth limitation determines the speed of transmission of the projection data to the processor for use in image reconstruction. The projection data are compressed prior to transmission so that more data can be transferred across the limited bandwidth channel. In applications where the projection data are stored, compression of the projection data allows more data to be stored in a given memory capacity or reduces the memory capacity requirements. Embodiments of the present invention also provide for decompression of the compressed projection data prior to reconstruction of an image.

Figure 1A:
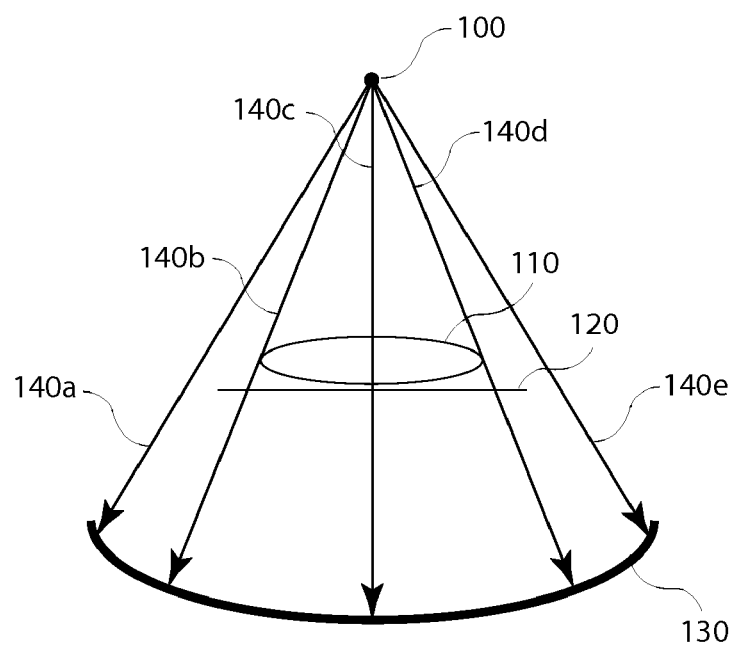
FIG. 1a is an illustration representing the basic configuration for CT scan data acquisition in a medical CT imaging system, in accordance with the prior art.

FIG. 1a is an illustration representing the basic configuration for CT scan data acquisition in a medical CT imaging system. An object or patient 110 is positioned on a platform 120 that can be moved back and forth within a rotating gantry (not shown) of a CT imaging system. The gantry includes an x-ray source 100 and a data acquisition subsystem (DAS) 130. The DAS 130 includes a matrix of one or more rows of x-ray sensors and analog to digital converters (ADCs). The ADCs digitize signals from the x-ray sensors to produce samples whose amplitudes represent x-ray counts or Hounsfield units. A present (2007) CT system can include a matrix of approximately 1024 x-ray sensors per slice, or row, and up to 64 slices per view. The x-ray source 100 generates a beam having a particular geometry, depending on the system design. The example shown in FIG. 1a has fan-beam geometry. The degree of attenuation of the x-ray depends on its path. In FIG. 1a, the rays 140a and 140e are unattenuated because they travel through the air. The ray 140c is attenuated because it is partially absorbed when traversing the object 110. The rays 140b and 140d traverse boundaries of the object 110, so they will be less attenuated than ray 140c. The array of x-ray sensors measures the received x-rays to form signals for the ADCs. The x-ray sensors of CT scanners require a dynamic range of many orders of magnitude to capture the range of attenuated and unattenuated x-ray signals from the x-ray source 100. The x-ray sensors of current (2007) CT scanners use ADCs that sample the x-ray sensor output using 16 to 24 bits per sample. For 16 bits per sample, the maximum (unattenuated) x-ray count is $2^{16}$, or 65,536. For 24 bits per sample the maximum x-ray count is $2^{24}$, or 16,777,216. For each view angle increment, the DAS 130 produces a set of projection data. The set of projection data includes an array of samples, where a line of samples in the array, or scan line, corresponds to the measurement of x-rays passing through a slice of the object 110. As the gantry rotates around the patient, multiple sets of projection data are captured and transferred across the slip ring to an external computer or processor (not shown in FIG. 1a). The processor applies an image reconstruction algorithm to the sets of projection data to form an image. The image reconstruction algorithm can produce two-dimensional cross-sectional images or three-dimensional images of the scanned object, depending on the scan protocol. The reconstructed image is then displayed for analysis by the user. The particular geometry of the x-ray source beam, the detector geometry, DAS 130 configuration or scan protocol do not limit applications of the present invention.

Figure 1B:
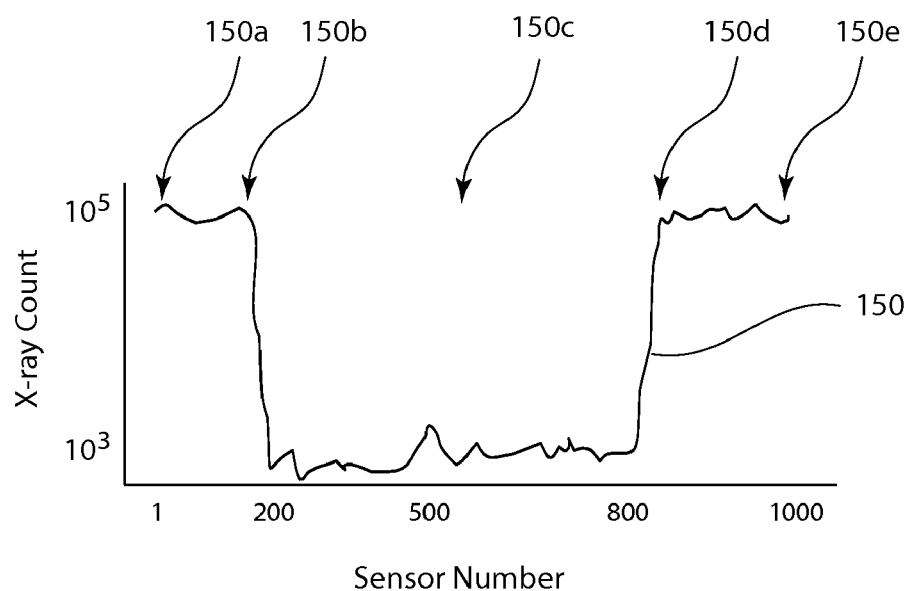
FIG. 1b illustrates an example of a signal 150 formed by projection data output from a row of sensors, in accordance with the prior art.

FIG. 1*b* illustrates an example of a signal 150 formed by projection data output from a row of sensors of DAS 130. The regions 150*a* and 150*e* correspond to the unattenuated rays 140*a* and 140*e* and have the maximum x-ray counts. The regions indicated by 150*b* and 150*d* are transitional regions representing the rays detected at the boundaries 140*b* and 140*d*. The region indicated by 150*c* corresponds to attenuated ray 140*c* that has traversed the object 110 and thus has a substantially lower x-ray count. The CT systems in use typically include a matrix of sensors that is wider than the objects that are scanned, so regions with unattenuated x-rays, such as regions 150*a* and 150*e* commonly occur in projection data. In the reconstructed image, these "empty" regions correspond to regions outside the reconstructed image. The CT image reconstruction algorithms typically do not use the projection data from the empty regions 150*a* and 150*e*.

A preferred embodiment of the present invention applies different compression operations to the projection data based on more significant and less significant regions of the projection data in order to achieve a compressed data bit rate within a desired range. In the example of FIG. 1*b*, regions 150*a* and 150*e* are less significant and regions 150*b*, 150*c* and 150*d* are more significant. In some situations, lossless compression is applied to the more significant and the less significant regions. However, in situations where the bit rate of the compressed data must be reduced further, lossy compression is applied to the less significant regions so that the accuracy of the compressed data of the more significant regions is preserved. In situations where further reductions in bit are required, lossy compression may also be applied to data in more significant regions.

Figure 2A:
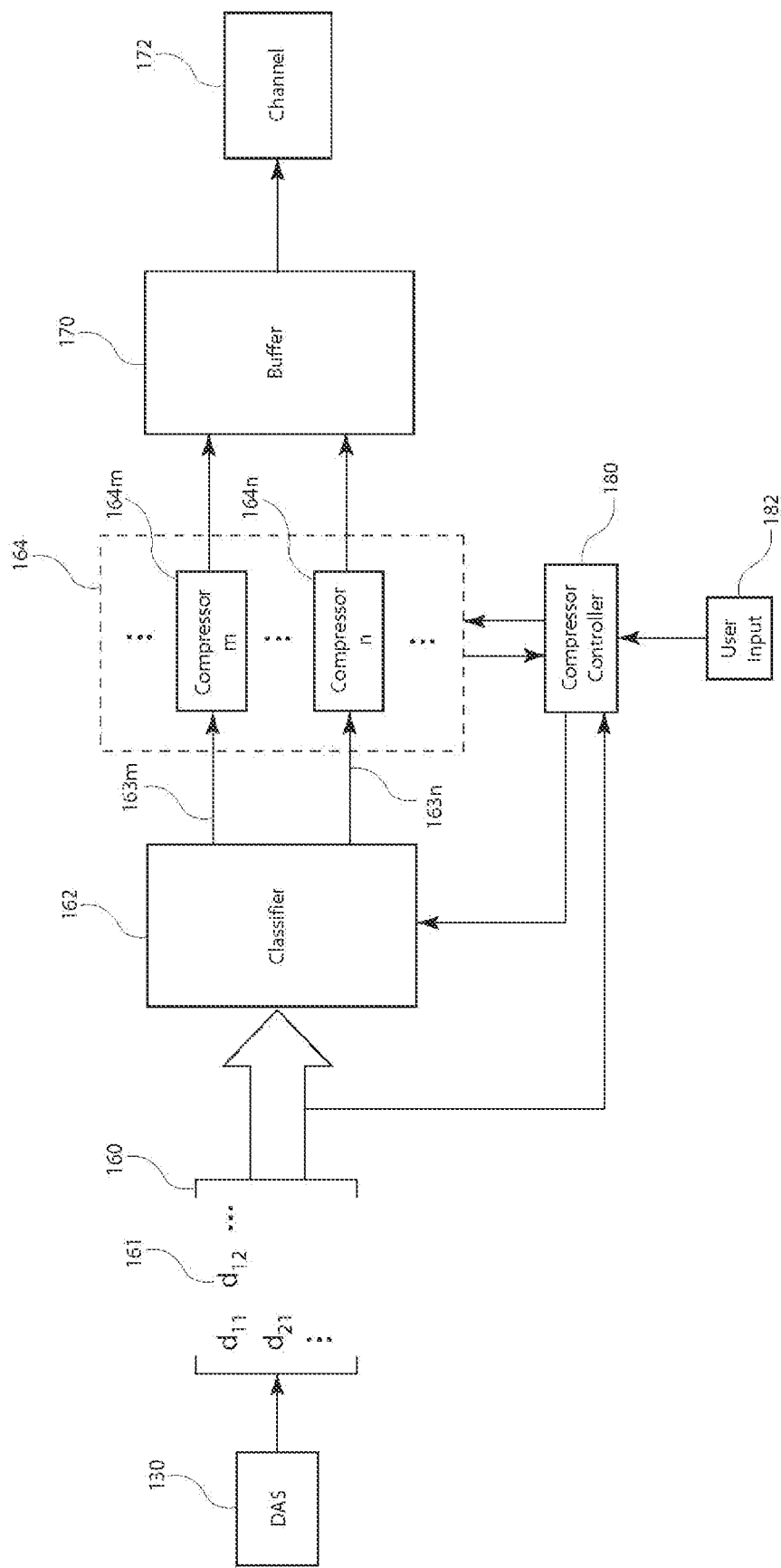
FIG. 2a is a block diagram of a compression system for projection data, in accordance with a preferred embodiment.

FIG. 2*a* is a block diagram of a compression system for projection data, in accordance with a preferred embodiment. The DAS 130 generates a set of projection data 160 for each view. The set of projection data comprises an array of projection data samples 161. The array geometry depends on the data acquisition process and does not limit the scope of the present invention. The set of projection data 160 includes projection data samples 161. The classifier 162 identifies at least one subset of more significant samples 163*m* and at least one subset of less significant samples 163*n*. The data compression processor 164 applies compressor 164*m* to the subset of samples 163*m* and compressor 164*n* to the subset of samples 163*n*. The compressed data are stored in a buffer 170 until they are transmitted across communication channel 172. The compression controller 180 provides compression control parameters to the data compression processor 164, including possibly different compression control parameters for the compressors 164*m* and 164*n*, and classification control parameters to the classifier 162. The compression controller 180 can also receive feedback from the buffer 170 and data compression processor 164. The feedback information can include compressed data bit rate and amount of data in the buffer 170. The compression controller 180 uses feedback information to adjust the compression control parameters so that the compressed data bit rate falls within a desired range. The compression control parameters can be encoded and included in the compressed data. The compression controller can also receive user input 182, such as a desired bit rate for compressed data, selection of compression methods and control parameters.

Figure 2B:
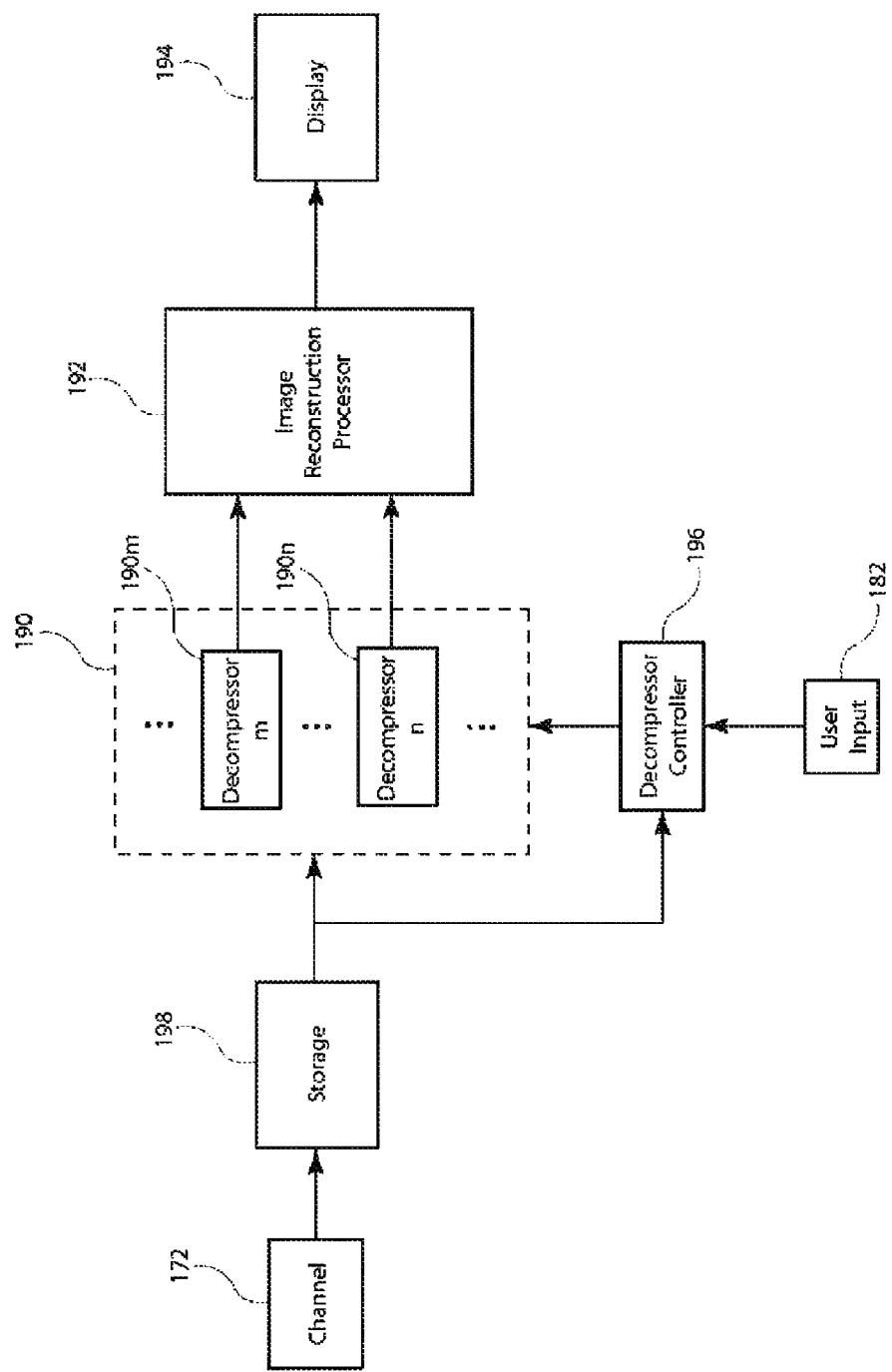
FIG. 2b is a block diagram of decompression for subsequent image reconstruction using the decompressed data, in accordance with a preferred embodiment.

FIG. 2*b* is a block diagram of a preferred embodiment for decompression for subsequent image reconstruction using the decompressed data. After transmission, the data decompression processor 190 applies decompressors 190*m* to 190*n* to the respective subsets of the compressed data. The image reconstruction processor 192 uses the decompressed data to compute an image using well-known CT image reconstruction algorithms. The reconstructed image can be presented on display 194. Alternatively, the compressed data may be stored in a storage device or data storage media prior to decompression by data decompression processor 190 and image formation by the image reconstruction processor 192. The decompression controller 196 provides compression control parameters to the data decompression processor 190. The decompression controller 196 can recover the compression control parameters from the compressed data. The decompression controller 196 optionally receives user input 182.

Figure 3:
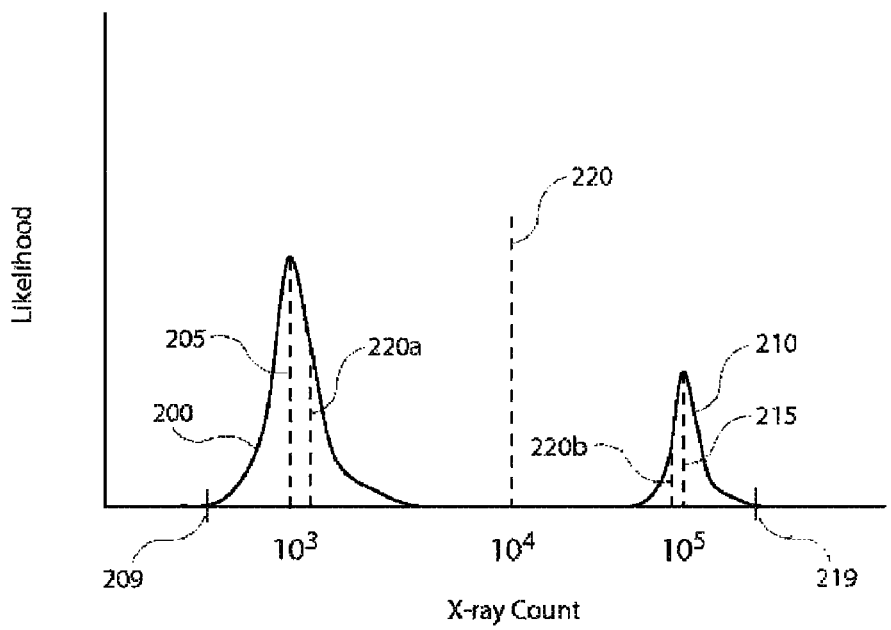
FIG. 3 is an example of a histogram plot of x-ray counts for the example signal.

In a preferred embodiment of the present invention, the classifier 162 compares the amplitudes of the samples to one or more thresholds in order to classify the samples into subsets. The compression controller 180 calculates a histogram of at least a portion of the projection data samples 161. FIG. 3 is an example of a histogram plot of x-ray counts for the example signal 150 in FIG. 1*b*. Alternatives for calculating histogram plot include using samples from a single row of sensors of the DAS 130, from the entire set of projection data 160 of a single view, or from sets of projection data from multiple views. For the example histogram shown in FIG. 3, the amplitudes fall into two clusters 200 and 210. The cluster 200 corresponds to the attenuated x-rays in the more significant region. The cluster 200 has a peak 205 at a count value of $10^3$. The cluster 210 corresponds to the unattenuated x-rays in the less significant regions. The cluster 210 has a peak 215 at count value $10^5$. The minimum x-ray count 209 represents the minimum x-ray count over a slice, view or series of views. The maximum x-ray count 219 represents the maximum count over a slice, view or series of views.

The compression controller 180 determines one or more amplitude thresholds as compression control parameters for classifying samples into more significant and less significant subsets. In the example of FIG. 3, the compression controller 180 could select a single amplitude threshold 220 having a value of $10^4$, midway between the histogram peaks 205 and 215. Alternatively, the compression controller 180 could select amplitude thresholds 220*a* and 220*b*, which would generate subsets for transitional regions. Amplitude thresholds can also be determined based on factors such as the x-ray count ranges corresponding to various tissues or structures. The user input 182 provided to the compression controller 180 can provide control information including numbers of subsets, the number of thresholds, the portion of projection data to use for calculating the histogram, how often to calculate a histogram and prior information on the threshold values themselves, including supplying the threshold values directly.

Figure 4:
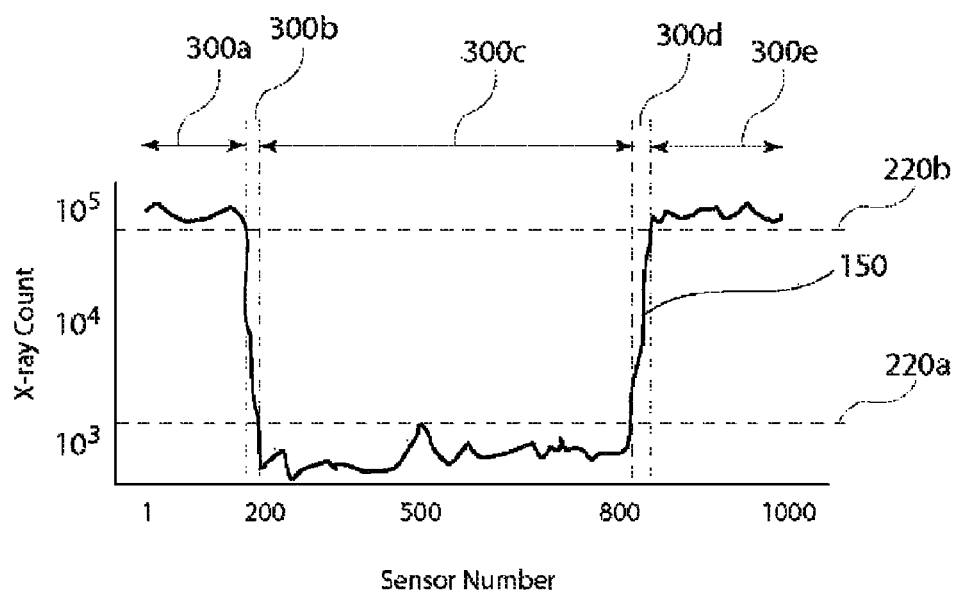
FIG. 4 illustrates an example of the classification of samples.

FIG. 4 illustrates an example of the classification of samples of signal 150 using the amplitude thresholds 220*a* and 220*b*. The classifier 162 applies the amplitude threshold 220*a* and 220*b* to classify the samples of projection data into five subsets. The less significant subsets 300*a* and 300*e* correspond to measurements of substantially unattenuated x-rays that have traveled through empty regions on either side of the object 110. The less significant subsets 300*b* and 300*d* include samples having transitional values that occur near the edges of the scanned object 110. The more significant subset 300c includes samples of projection data that correspond to attenuated x-rays that have traversed the interior of the object 110. The classifier 162 can employ additional thresholds that would generate additional subsets.

The classifier 162 can apply boundary locations for classifying samples into more significant and less significant subsets, instead of or in addition to amplitude thresholds. Some CT imaging protocols employ scout scans for approximating the boundaries for the scanned object in the projection data. Scout scans or other methods for measuring or approximating boundaries can be used to establish the boundary locations used for classification. The classifier 162 can compare the positions of the samples in the projection data to the relevant boundary location to determine the appropriate subset for each sample. The boundary locations can also correspond to boundaries of a region of interest within the scanned object in addition to a boundary between the object and an empty region. The compression controller 180 provides the boundary locations as classification control parameters to the classifier 162. For preferential compression of a region of interest, the classifier can define a more significant subset for the projection samples corresponding to the region of interest, a less significant subset for the projection samples corresponding to the region of the object that is not of interest and another less significant subset for the projection samples corresponding to the empty region. The compression controller 180 provides different compression parameters to the compressors for the various subsets such that the degree of compression will be depend on the importance of the region. The user input 182 can define the region of interest and specify compression data rates for the different classes of samples. An example of classifying samples for a region of interest is described below with respect to FIGS. 8 and 9.

Figure 5:
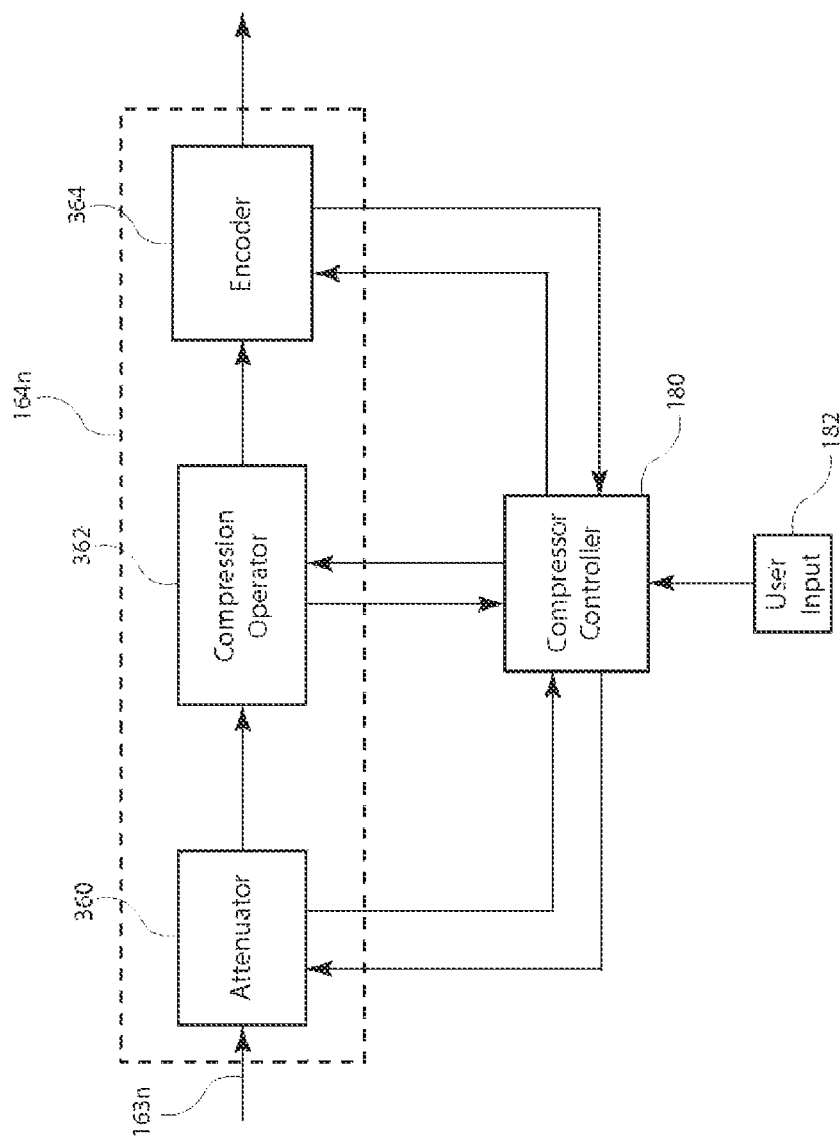
FIG. 5 is a block diagram of one compressor of the data compression processor, in accordance with a preferred embodiment.

FIG. 5 is a block diagram of a compressor 164n of the data compression processor 164. An adjustable attenuator 360 applies a controllable level of attenuation to the subset of samples 163n. The compression controller 180 provides at least one attenuation control parameter to the attenuator 360 to control the level of attenuation. The attenuation is controlled to apply greater attenuation to the less significant samples and less or no attenuation to the more significant samples. Alternative embodiments for the attenuator include a multiplier such that the samples 163n are multiplied by a factor less than one to reduce their amplitudes, a shift register to remove a number of least significant bits (LSBs) of the samples 163n, or a combination of a multiplier and a shift register.

The compression operator 362 performs operations to reduce the number of bits representing the amplitudes of the attenuated samples. The compression operator 362 includes one or more of a difference operator and a quantizer. The difference operator calculates first or higher order differences of samples in the subset 163n and selected samples. There are several alternatives for the selected samples. The difference operator can calculate differences as follows:
1) Calculating differences between consecutive samples of the same row within the subset 163n;
2) Calculating differences between the samples in the subset 163n in a given row (or column) and samples in corresponding positions in another row (or column) within the set of projection data;
3) Calculating differences between the samples in the subset 163n and the samples in the corresponding positions in another set of projection data.

Figure 6:
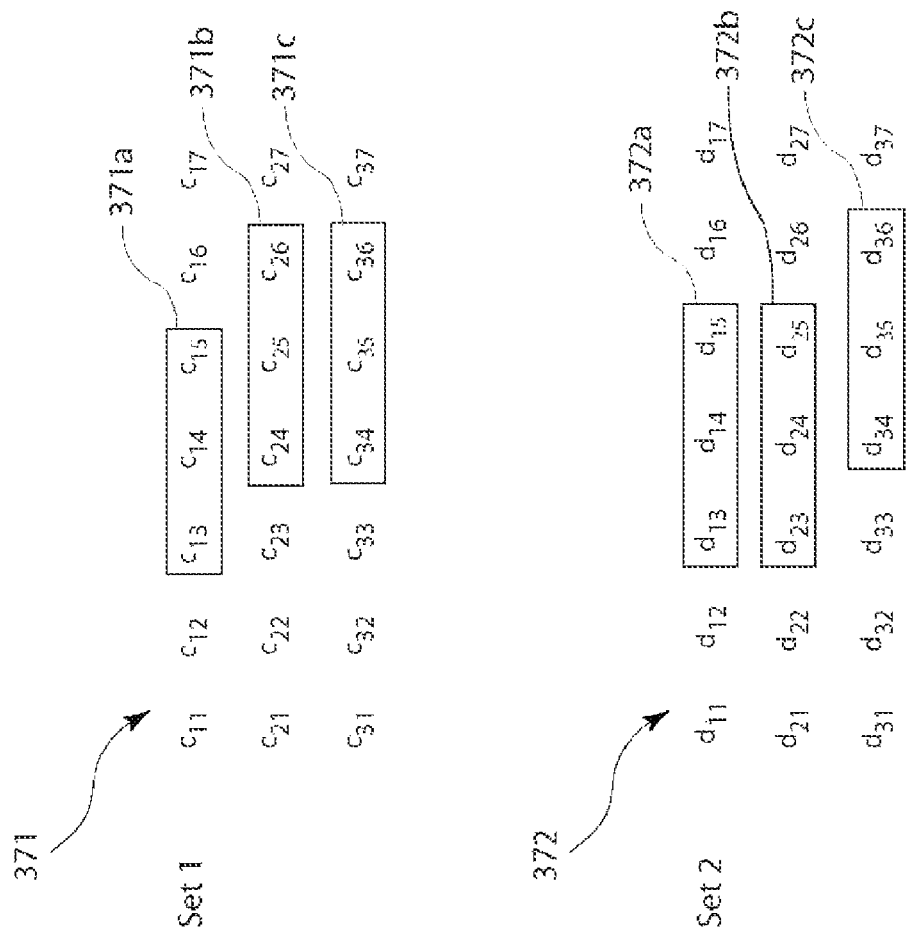
FIG. 6 illustrates elements of two sets of projection data.

FIG. 6 illustrates elements of two sets of projection data 371 and 372. The boxed elements 371a, 371b and 371c indicate the elements of the more significant subsets in projection data set 371. The boxed elements 372a, 372b and 372c indicate the elements of the more significant subsets in projection data set 372. For the first alternative the difference operator calculates differences between consecutive samples in more significant subsets of the same row. For example for the first row of set 371, differences calculated between samples are:

$$\text{Diff1} = c_{14} - c_{13} \quad (1)$$

$$\text{Diff2} = c_{15} - c_{14} \quad (2)$$

For the alternative of calculating differences between samples in different rows of the same set of projection data, an example for the subset 371a in the first row and the subset 371b in the second row of set 371 is as follows:

$$\text{Diff1} = c_{24} - c_{14} \quad (3)$$

$$\text{Diff2} = c_{25} - c_{15} \quad (4)$$

For the alternative of calculating differences between samples in different sets of projection data, an example for the subset 371a in the first row of the projection data set 371 and the subset 372a in the first row of the projection data set 372 is as follows:

$$\text{Diff1} = d_{13} - c_{13} \quad (5)$$

$$\text{Diff2} = d_{14} - c_{14} \quad (6)$$

$$\text{Diff3} = d_{15} - c_{15} \quad (7)$$

For second order differences, the difference operator also calculates for the respective examples:

$$S\text{diff1} = \text{Diff2} - \text{Diff1} \quad (8)$$

$$S\text{diff2} = \text{Diff3} - \text{Diff2} \quad (9)$$

For third order differences, the difference operator also calculates for the respective examples:

$$T\text{diff1} = S\text{diff2} - S\text{diff1} \quad (10)$$

The compression controller 180 provides control parameters that configure the difference operator to perform the desired difference calculations. The compression controller 180 can respond to user input 182 to set control parameters for the difference operator. The difference values are quantized and/or encoded to form the compressed data.

As stated above, the compression operator 362 can include a quantizer. The quantizer can perform lossy compression on its input samples by decreasing the number of quantization levels used to represent the range of values of the input samples, thus reducing the quantization resolution. The decreased number of quantization levels requires a lower number of bits to represent each sample, thus reducing the bit rate of the compressed data. The quantizer can be applied to the output from the difference operator, the output of the attenuator 360 or the output of the classifier 162. The compression controller provides control parameters to set different quantization resolutions for the more significant subsets and the less significant subsets. The compression controller 180 can adapt the quantization resolution in response to feedback on compressed data bit rate from the data compression processor 164 or feedback indicating the fullness of the buffer 170 receiving the compressed data. The compression controller 180 can also respond to user input 182 to set the quantization resolutions for the more significant subsets and the less significant subsets.

The encoder 364 applies well-known techniques for encoding and bit-packing to the output samples of the compression operator 362. Alternatives include block-floating point encoding and Huffman encoding. The encoder 364 provides control bits to identify more significant subsets and less significant subsets of compressed data. The encoder 364 also encodes the corresponding control parameters for the subsets. The compressed data stream includes the encoded subsets, control parameters and control bits.

For feedback control, the encoder 364 can monitor the bit rate of the compressed data and provide the measured bit rate to the compression controller 180. The compression controller 180 can compare the measured bit rate to a desired bit rate or range of bit rates provided by the user input 182 or feedback from buffer 170. The compression controller 180 adjusts control parameters for classifier 162 and the data compression processor 164 to achieve the desired bit rate. A preferred strategy for the compression controller 180 is to adjust the control parameters so that lossy compression is applied to the less significant subsets and lossless compression is applied to the more significant subsets. Each of the elements of compressor 164n for a more significant subset can be configured for lossless compression. For lossless compression, the attenuator 360 bypasses the input samples 163n and the compression operator 362 applies difference operations without additional quantization. However, the user may direct the compression controller 180 to apply lossy compression a more significant subset to achieve the desired bit rate.

For less significant subsets that include samples from empty regions, the compressor 164n can simply encode the boundary location with the adjacent more significant subset instead of compressing projection data in empty regions. For decompression in this situation, the decompressor 190n for the less significant subset decodes the boundary location. The decompressor 190m for the adjacent more significant subset decompresses the compressed projection data. The decoded boundary location provides the position of the decompressed projection data in the scan line for the image reconstruction processor 192.

Figure 7:
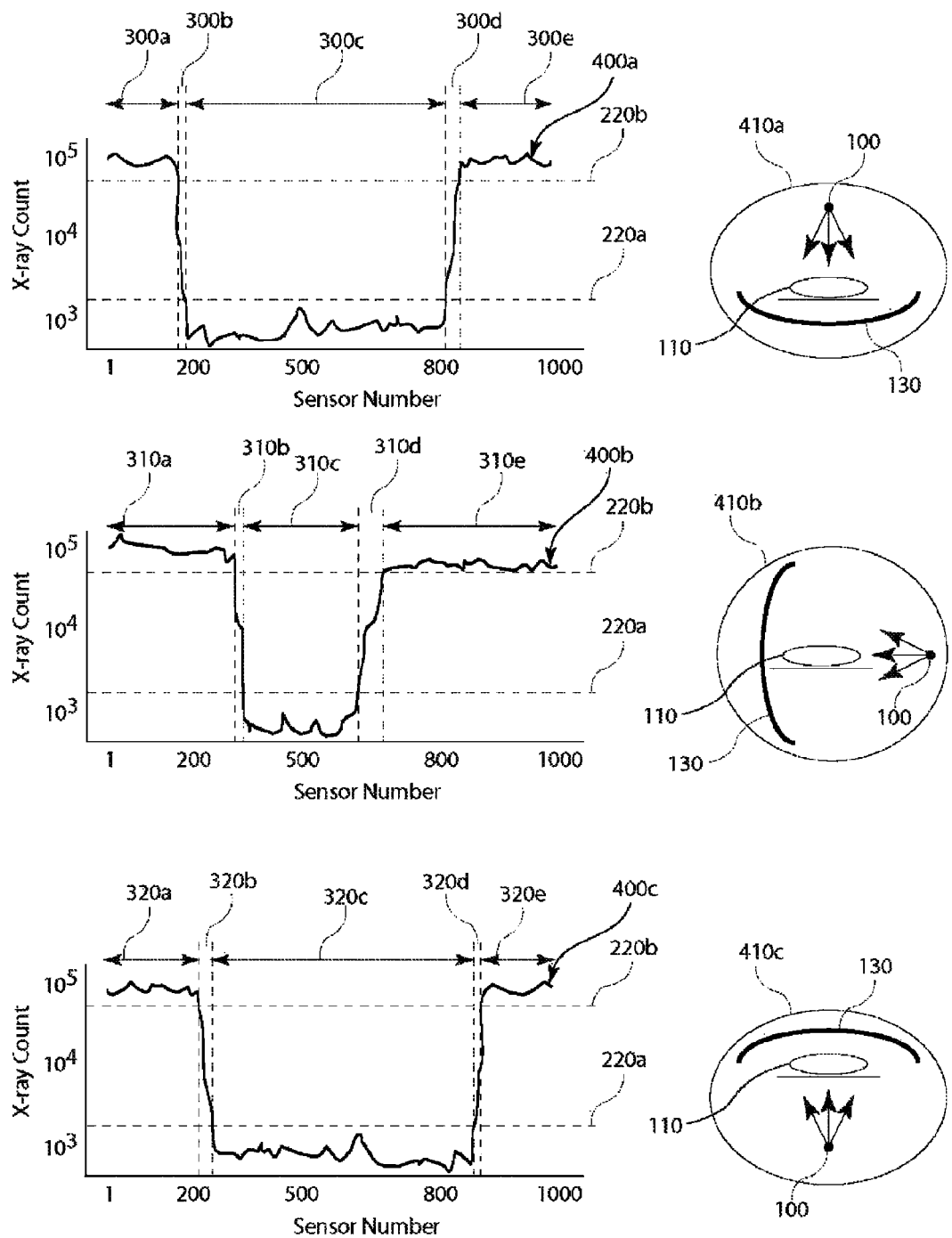
FIG. 7 illustrates examples of subsets in the projection data for different view angles.

FIG. 7 illustrates examples of subsets in the projection data for different view angles. These examples use the same amplitude thresholds 220a and 220b. The plot 400a is the same as that shown in FIG. 4 and corresponds with the orientation 410a having a view angle of zero degrees. The plot 400b corresponds to the orientation 410b having a view angle of 90 degrees. The more significant regions 310b, 310c and 310d include fewer samples than the more significant regions 300b, 300c and 300d and the less significant regions 310a and 310e include more samples than the less significant regions 300a and 300e. The plot 400c corresponds to the orientation 410c having a view angle of 180 degrees. Since the x-rays are traversing the same path but in the opposite direction from that of orientation 410a, the plot 400c approximates a mirror image of plot 400a. The plot 400c includes more significant regions 320b, 320c and 320d and less significant regions 320a and 320e. FIG. 7 shows that the sizes of the more significant and less significant subsets vary in different sets of projection data corresponding to different view angles. The example of plot 400b shows that for some view angles, a majority of the samples are classified in less significant subsets so that lossy compression of the less significant subsets will dramatically reduce the compressed data bit rate for those view angles.

Figure 8:
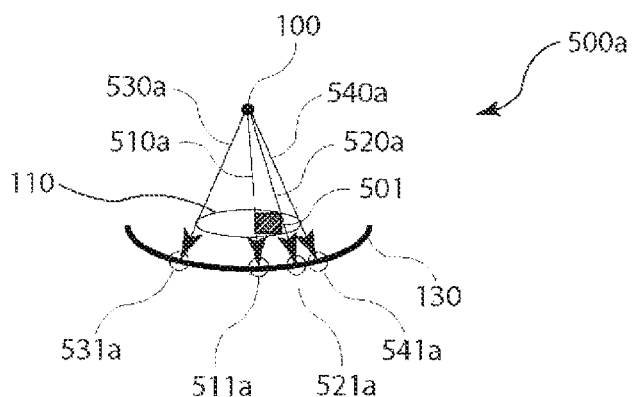
FIG. 8 gives an example of defining boundaries of a region of interest.
Figure 8:
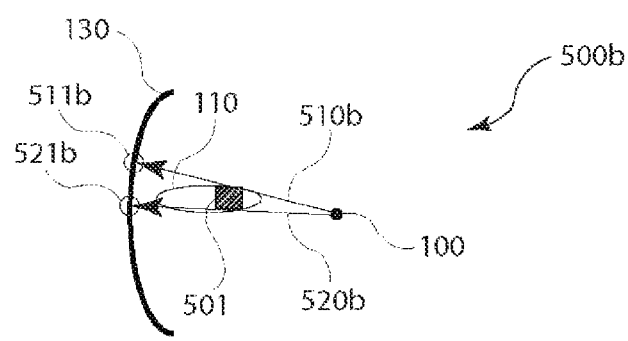
Figure 8:
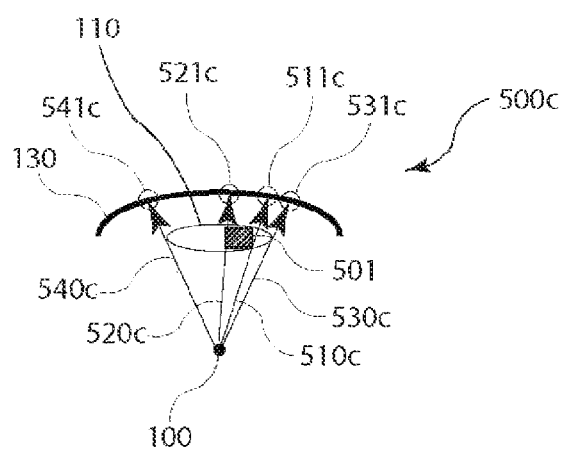

FIG. 8 gives an example of defining boundaries of a region of interest. Protocols for CT scanners can include a scout scan consisting of one rotation around the patient or a lateral movement of the table without gantry rotation. A scout scan determines the patient's density to x-rays and provides a general outline of the patient 110 in a few seconds. In FIG. 8, a region of interest 501 is defined in the patient 110. Orientation 500a shows that x-ray paths 510a and 520a traverse a boundary of the region of interest 501 and are detected at sensor positions 511a and 521a of the DAS 130. The boundary of the patient 110 is traversed by rays 530a and 540a detected by sensors 531a and 541a. For orientation 500b, the x-ray paths 510b and 520b traverse different boundaries of the region of interest 501 and are detected at sensor positions 511b and 521b. For the orientation 500b, the rays 510b and 520b also traverse the boundary of the patient 110. For orientation 500c, the x-ray paths 510c and 520c traverse boundaries of the region of interest 501 and are detected at sensor locations 511c and 521c. The rays 530c and 540c traverse the boundary of the patient 110 and are detected at sensor locations 531c and 541c. The sensor positions for each orientation correspond to boundary locations for subsets of samples in the scan line. The boundary locations in a scan line are a function of view angle and can be predicted from the spatial domain coordinates of the boundaries using the well-known geometric relationships in computed tomography. The classifier 162 can apply the predicted boundary locations for each set of projection data as a function of the view angle to classify the samples into more significant subsets and less significant subsets.

Figure 9:
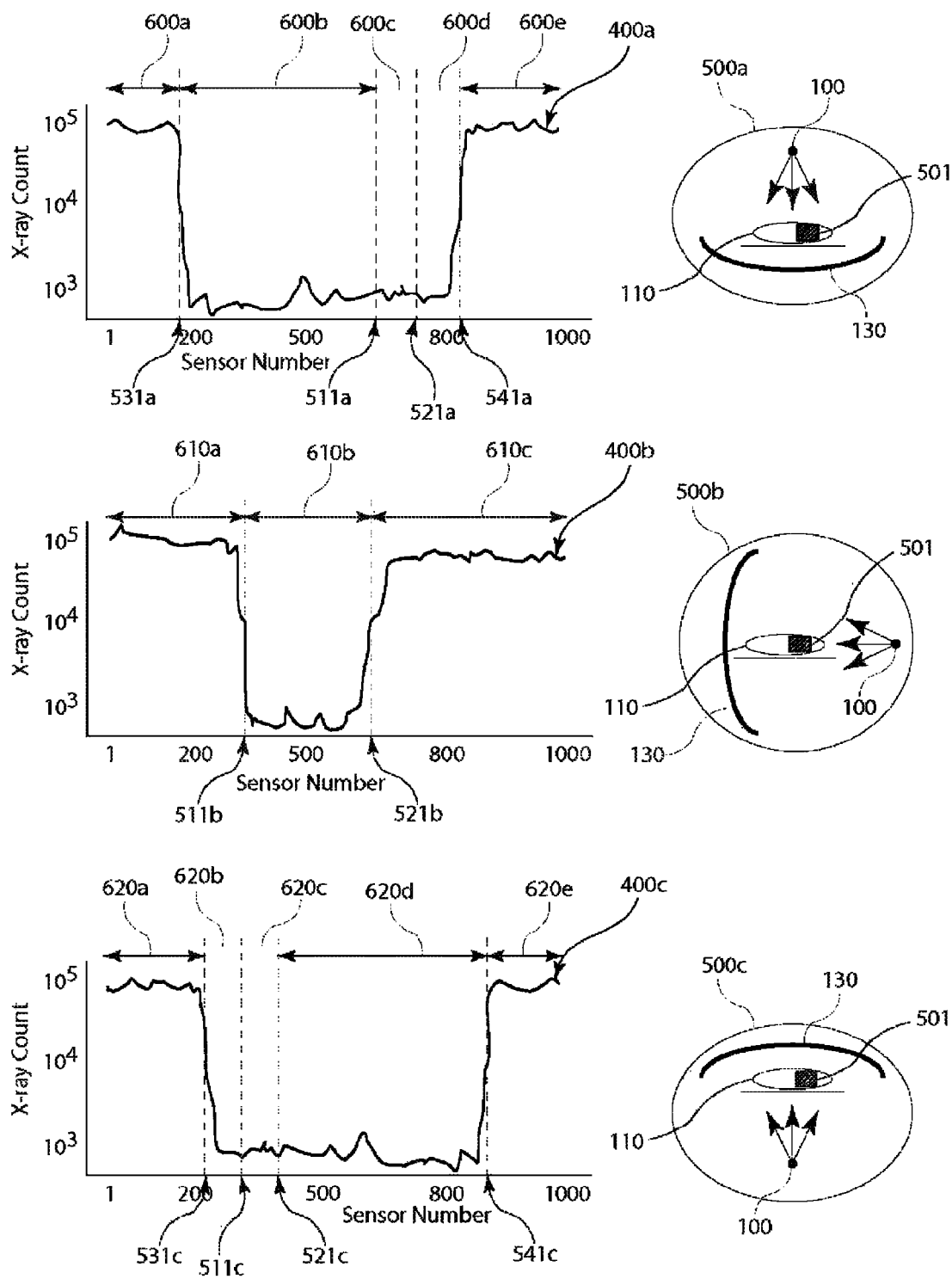
FIG. 9 gives examples of the predicted boundary locations for subsets in the projection data.

FIG. 9 gives examples of the predicted boundary locations for subsets in the projection data. The plots 400a, 400b and 400c are the same as those shown previously for the examples in FIG. 7. In the plot 400a, the boundary locations 531a and 541a correspond to the boundary of the patient 110 and the boundary locations 511a and 521a correspond to the boundary of the region of interest 501. The projection data are classified into five subsets, the more significant subset 600c corresponds to the region of interest, the less significant subsets 600b and 600c correspond to interior regions outside the region of interest 501 and the less (or least) significant subsets 600a and 600e correspond to the empty region. In the plot 400b the boundary locations 511b and 521b coincide for both the region of interest 501 and the boundary of the patient 110. The projection data are classified into three subsets, the more significant subset 610b corresponds to the region of interest 501 and the less significant subsets 610a and 610c correspond to the empty region. In the plot 400c, the boundary locations 531c and 541c correspond to the boundary of the patient 110, the boundary locations 511c and 521c correspond to the boundary of the region of interest 501. The projection data are classified into five subsets, the more significant subset 620c corresponds to the region of interest, the less significant subsets 620b and 620d correspond to the interior regions outside the region of interest and the less (or least) significant subsets 620a and 620e correspond to the empty region.

Figure 10:
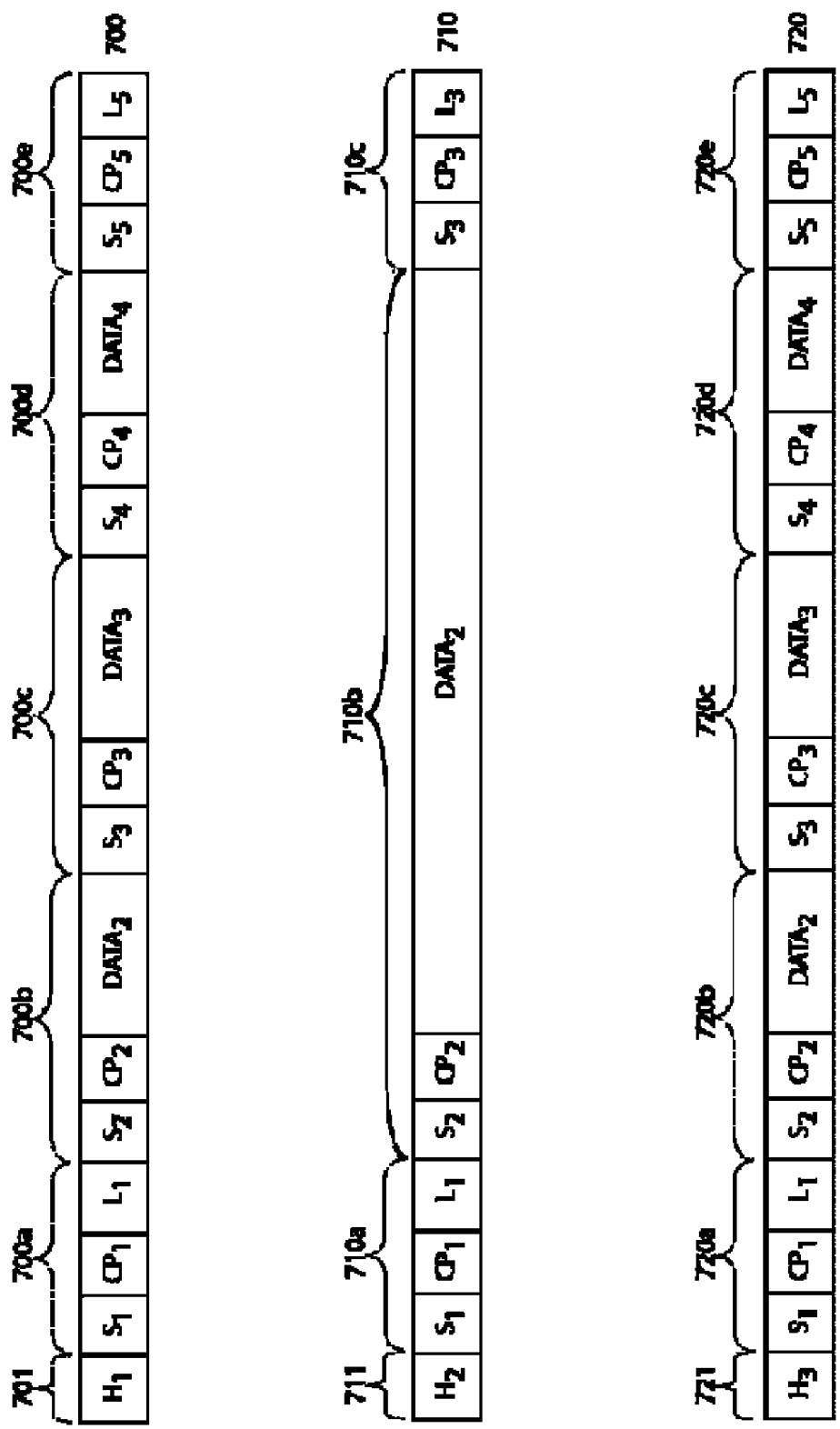
FIG. 10 gives examples of data structures for the compressed projection data.

FIG. 10 gives examples of data structures for the compressed data of the subsets defined in FIG. 9. The data structures 700, 710 and 720 have headers 701, 711 and 721, respectively, that contain scan information, such as the view angle. The compressed data for each subset begins with a marker for the subset $S_i$ followed by an encoded control parameter $CP_i$. More than one control parameter can be included for a subset. The control parameters are decoded by the decompressor controller 196 (FIG. 2b) so that the appropriate decompression can be applied to the subset's compressed data. For less significant subsets corresponding to empty regions, a location parameter $L_i$ indicates the position of the boundary of the corresponding less significant subset with an adjacent subset having compressed projection data. The $DATA_i$ fields represent compressed projection data for the corresponding subset. The data structure 700 corresponds to the compressed subsets of the projection data of plot 400a. The fields 700a and 700e represent the less significant subsets 600a and 600e, respectively, that correspond to the empty region and therefore include location parameters $L_1$ and $L_5$. The fields 700b, 700c and 700e correspond with the subsets 600b, 600c and 600d that include compressed projection data. The data structure 710 corresponds to the projection data of plot 400b. The fields 710a, 710b and 710c represent the subsets 610a, 160b and 610c, respectively. The data structure 720 corresponds to the projection data of plot 400c. The fields 720a and 720e represent the less significant subsets 620a and 620e corresponding to the empty region. The fields 720b, 720c and 720d represent the compressed projection data in subsets 620b, 620c and 620d, respectively.

An embodiment of the present invention can be implemented as a compression subsystem in the DAS 130. In an application specific integrated circuit (ASIC) for the DAS 130 that includes an ADC, the compression subsystem can be integrated into the ASIC to compress samples output from the ADC. In an alternative implementation, the compression subsystem is embodied in a separate device that is coupled to the output of an ADC chip in the DAS 130. The device can be implemented as an ASIC, a field programmable gate array (FPGA), or a programmable processor, such as a digital signal processor (DSP), microprocessor or microcontroller. Depending on the CT system architecture, the decompression subsystem may be incorporated into the same device as or a different device from the image reconstruction processor. The decompression subsystem could be implemented in an ASIC, FPGA or programmable processor. The user interface can be incorporated into the control console for the CT system using programming techniques well known in the art.

While embodiments of the present invention are described herein using examples related to medical applications of computed tomography, the present invention is not limited to medical applications. Embodiments of the present invention can also be adapted for use in industrial computed tomography. In industrial computed tomography systems, the apparatus that moves the object, x-ray source and detector array is designed for the types of objects being tested. During a scan of the object, the relative motion of the object, x-ray source and detector array results in several views that generate sets of projection data to which embodiments of the present invention can be applied.

While the preferred embodiments of the invention have been illustrated and described, it will be clear that the invention is not limited to these embodiments only. Numerous modifications, changes, variations, substitutions and equivalents will be apparent to those skilled in the art, without departing from the spirit and scope of the invention, as described in the claims.

What is claimed is:

1. A method for compressing projection data in a computed tomography system, the computed tomography system providing a plurality of sensor measurements to form one or more sets of projection data, wherein each set of projection data represents a portion of a projection domain and includes an array of samples, the array having at least one line, the samples including more-significant samples and less-significant samples, the method comprising:
   setting one or more compression control parameters to control compression operations, the compression control parameters including at least one compression control parameter corresponding to the more-significant samples and at least one compression control parameter corresponding to the less-significant samples;
classifying the samples of at least one line in the set of projection data into at least two subsets in accordance with a classification control parameter, the subsets including at least one more-significant subset containing the more-significant samples and at least one less-significant subset containing the less-significant samples;
   compressing the samples of each subset by applying the compression operations in accordance with the corresponding compression control parameter to form a corresponding subset of compressed data, wherein a compression ratio for the less-significant subset is greater than a compression ratio for the more-significant subset; and
adjusting one or more of the compression control parameters in accordance with a feedback parameter based on a characteristic of the compressed data.

2. The method of claim 1, wherein the step of adjusting one or more of the compression control parameters further comprises:
   measuring a bit rate of the compressed data to form a measured bit rate;
   comparing the measured bit rate to a desired bit rate to form the feedback parameter; and
   adjusting the corresponding compression control parameter of at least one less-significant subset in accordance with the feedback parameter, wherein the step of compressing applies lossy compression operations to at least one less-significant subset in response to the corresponding compression control parameter to reduce the bit rate of the compressed data.

3. The method of claim 1, wherein the step of compressing applies lossy compression operations to at least one of the less-significant subset and the more-significant subset in accordance with the corresponding compression control parameter.

4. The method of claim 1, further comprising storing the compressed data in a buffer having a storage capacity, wherein the step of adjusting further comprises:
   detecting a fullness condition for the buffer with respect to the storage capacity to form the feedback parameter; and
   modifying the corresponding compression control parameter of at least one less-significant subset in accordance with the feedback parameter, wherein the step of compressing applies lossy compression operations to at least one less-significant subset in response to the corresponding compression control parameter to produce a lower number of bits of the compressed data for storage in the buffer.

5. The method of claim 1, wherein the step of compressing further comprises:
   computing a plurality of differences between consecutive samples of at least a portion of the more-significant subset to form a plurality of difference samples; and
   encoding the plurality of difference samples to form at least a portion of the corresponding subset compressed data.

6. The method of claim 1, wherein the array includes a plurality of lines of samples, the step of compressing further comprising:
   computing a plurality of differences between a plurality of samples from at least a portion of the more-significant subset of a first line of the set of projection data and a plurality of corresponding samples of a second line of the set of projection data to form a plurality of difference samples; and
   encoding the plurality of difference samples to form at least a portion of the corresponding subset of compressed data.

7. The method of claim 1, wherein the step of compressing further comprises:

computing a plurality of differences between a plurality of samples from at least a portion of the more-significant subset of a first set of projection data and corresponding samples in a second set of projection data to form a plurality of difference samples; and encoding the plurality of difference samples to form at least a portion of the corresponding subset of compressed data.

8. The method of claim 1, wherein the step of compressing further comprises:

determining at least one descriptor for the less-significant subset; and encoding the descriptor to form at least a portion of the corresponding subset of compressed data.

9. The method of claim 8, wherein the descriptor represents a boundary location of a series of consecutive samples included in the less-significant subset and an adjacent more-significant subset.

10. The method of claim 1, wherein the step of compressing further comprises at least one of the following steps:

attenuating the samples of the less-significant subset in accordance with an attenuation control parameter; and quantizing the samples of the less-significant subset in accordance with the corresponding compression control parameter.

11. The method of claim 1, wherein the classification control parameter represents an amplitude threshold, the step of classifying further comprising:

comparing an amplitude value of each sample in at least a portion of the samples to the amplitude threshold to form a comparison value; and selecting the subset for the sample based on the comparison value.

12. The method of claim 11, further comprising:

determining the amplitude threshold based on a statistic of a plurality of samples of the projection data.

13. The method of claim 1, wherein the step of classifying further comprises:

comparing a position value of each sample in at least a portion of the samples to a predetermined boundary location to form a comparison value; and selecting the subset for the sample based on the comparison value.

14. The method of claim 1, further comprising:

decompressing the subsets of compressed data by applying respective decompression operations in accordance with the corresponding compression control parameters to form at least one more-significant subset and at least one less-significant subset of decompressed data; and providing the decompressed data to an image reconstruction processor for producing a spatial domain image.

15. The method of claim 14, wherein the step of decompressing further comprises:

extracting a descriptor from the less-significant subset of decompressed data, wherein the descriptor represents a boundary location between the less-significant subset and an adjacent more-significant subset; and determining position values of the decompressed data of the adjacent more-significant subset based on the boundary location.

16. The method of claim 1, further comprising:

transmitting the compressed data over a communication channel of a slip-ring interface.

17. A data compression apparatus for projection data measured by a computed tomography system, the computed tomography system providing a plurality of sensor measurements to form one or more sets of projection data, wherein each set of projection data represents a portion of a projection domain and includes an array of samples, the array having at least one line, the samples including more-significant samples and less-significant samples, the data compression apparatus comprising:

a classifier coupled to receive the projection data and classifying the samples in at least one line of the projection data into at least two subsets to produce at least one more-significant subset and at least one less-significant subset in accordance with a classification control parameter;

a compressor that receives the more-significant subset and the less-significant subset and applies respective compression operations to the samples of each subset in accordance with a corresponding compression control parameter to form corresponding subsets of compressed data, wherein a compression ratio for the less-significant subset is greater than a compression ratio for the more-significant subset; and a controller coupled to the classifier and the compressor, the controller determining a feedback parameter and adjusting at least one compression control parameter in accordance with the feedback parameter.

18. The compression apparatus of claim 17, wherein the controller further comprises:

a bit rate monitor that measures a bit rate of the compressed data to produce a measured bit rate;

a comparator that compares the measured bit rate to a desired bit rate to form the feedback parameter; and a control parameter calculator that adjusts the corresponding compression control parameter for at least one less-significant subset if the feedback parameter indicates that the measured bit rate is greater than the desired bit rate, wherein the compressor applies lossy compression operations to the less-significant subset in response to the corresponding compression control parameter to reduce the bit rate of the compressed data.

19. The compression apparatus of claim 17, wherein the compressor applies lossy compression operations to the more-significant subset and the less-significant subset in accordance with the corresponding compression control parameter.

20. The compression apparatus of claim 17, further comprising:

a buffer coupled to the compressor, the controller and a data transfer interface, wherein the buffer stores the compressed data and provides the compressed data to the data transfer interface at a data rate, the buffer having a storage capacity.

21. The compression apparatus of claim 20, wherein the controller further comprises:

a detector that determines a fullness condition of the buffer to form the feedback parameter; and a control parameter calculator that adjusts the corresponding compression control parameter for at least one less-significant subset in accordance with the feedback parameter, wherein the compressor applies lossy compression operations to the less-significant subset in response to the corresponding compression control parameter to reduce a bit rate of the compressed data.

22. The compression apparatus of claim 20, further wherein the data transfer interface comprises a communication channel for a slip ring interface.

23. The compression apparatus of claim 17, wherein the classifier, the compressor and the controller are embodied in a FPGA or an ASIC.

24. An apparatus for decompression of compressed projection data, the compressed projection data corresponding to original projection data resulting from sensor measurements in a computed tomography system, the apparatus comprising:

a storage device storing the compressed projection data, wherein the compressed projection data include a plurality of more-significant subsets and a plurality of less-significant subsets of compressed data;

a decompressor applying respective decompression operations to the more-significant subsets and less-significant subsets of compressed data in accordance with corresponding compression control parameters to form more-significant subsets of decompressed data and less-significant subsets of decompressed data, the decompressor providing the decompressed data to an image reconstruction processor; and a controller extracting the corresponding compression control parameters from the compressed data and providing the corresponding control parameters to the decompressor.

25. The decompression apparatus of claim 24, wherein the decompressor applies lossless decompression operations to the more-significant subset of compressed data and lossy decompression operations to the less-significant subset of compressed data in accordance with the corresponding compression control parameters.

* * * * *